US012136111B2

(12) United States Patent
Stoliartchouk et al.

(10) Patent No.: US 12,136,111 B2
(45) Date of Patent: *Nov. 5, 2024

(54) SYSTEM AND METHOD FOR AFFILIATE LINK GENERATION

(71) Applicant: rewardStyle, Inc., Dallas, TX (US)

(72) Inventors: Alexei Stoliartchouk, Kensington, CA (US); Forrest Jordan, Dallas, TX (US); Baxter Box, Dallas, TX (US)

(73) Assignee: rewardStyle, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/156,598

(22) Filed: Jan. 19, 2023

(65) Prior Publication Data

US 2023/0153864 A1 May 18, 2023

Related U.S. Application Data

(63) Continuation of application No. 17/821,495, filed on Aug. 23, 2022, now Pat. No. 11,599,917, which is a
(Continued)

(51) Int. Cl.
  *G06F 17/00* (2019.01)
  *G06Q 30/02* (2023.01)
  *G06Q 30/0241* (2023.01)

(52) U.S. Cl.
  CPC ......... *G06Q 30/0277* (2013.01); *G06Q 30/02* (2013.01)

(58) Field of Classification Search
  CPC ........................... G06Q 30/0277; G06Q 30/02
  (Continued)

(56) References Cited

U.S. PATENT DOCUMENTS

| 5,812,769 A | 9/1998 | Graber et al. |
| 6,029,141 A | 2/2000 | Bezos et al. |

(Continued)

FOREIGN PATENT DOCUMENTS

| WO | WO-2006099407 A2 * | 9/2006 | ........... G06F 16/951 |
| WO | WO 2007021974 A | 2/2007 | |

(Continued)

OTHER PUBLICATIONS

The Reply in response to the Communication of Feb. 9, 2017 as filed with the European Patent Office on May 15, 2015 for co-pending European patent application No. 13717619.4.
(Continued)

*Primary Examiner* — Matthew Ell
*Assistant Examiner* — Matthew J Ludwig
(74) *Attorney, Agent, or Firm* — Bookoff McAndrews, PLLC

(57) ABSTRACT

A method and system is provided for facilitating affiliate link generation. A user enables the system by identifying a webpage on an affiliate web site. The system performs an initial assessment of page to extract webpage information, which is compared to information stored in a database. If the extracted information matches stored information, a record of the webpage is displayed and an affiliate link is dynamically generated for immediate use. If the extracted information does not match stored information, a new record of the webpage is created. If the webpage contains product-specific data, a product-specific record is stored. If the webpage does not contain product-specific data, a non-product record is stored. An affiliate link is then dynamically created. The new record of the product and dynamically created affiliate link is added to the database for immediate use.

20 Claims, 2 Drawing Sheets

Related U.S. Application Data continuation of application No. 17/232,977, filed on Apr. 16, 2021, now Pat. No. 11,455,665, which is a continuation of application No. 13/547,771, filed on Jul. 12, 2012, now Pat. No. 11,010,795.

(60) Provisional application No. 61/617,857, filed on Mar. 30, 2012.

(58) Field of Classification Search
USPC .............................. 715/208; 705/14.1, 14.16
See application file for complete search history.

(56) References Cited

U.S. PATENT DOCUMENTS

| | | | |
|---|---|---|---|
| 6,141,666 A | 10/2000 | Tobin | |
| 6,334,111 B1 | 12/2001 | Carrott | |
| 6,615,238 B1 | 9/2003 | Melet et al. | |
| 6,629,135 B1* | 9/2003 | Ross, Jr. | G06Q 30/0635 715/255 |
| 7,032,168 B1 | 4/2006 | Gerace et al. | |
| 7,359,869 B1 | 4/2008 | Ananda | |
| 7,480,627 B1 | 1/2009 | Van Horn et al. | |
| 7,617,122 B2 | 11/2009 | Kumar et al. | |
| 7,912,755 B2 | 3/2011 | Perry | |
| 8,145,537 B2 | 3/2012 | Wehmann | |
| 8,285,598 B2 | 10/2012 | Mesaros | |
| 8,374,918 B2 | 2/2013 | Wehmann | |
| 8,515,825 B1 | 8/2013 | Ross, Jr. et al. | |
| 8,613,072 B2 | 12/2013 | Nice | |
| 8,635,119 B1* | 1/2014 | Hariharan | G06Q 30/0631 705/26.7 |
| 9,143,478 B2 | 9/2015 | Ramaswamy | |
| 9,208,247 B2 | 12/2015 | Gardner | |
| 9,276,994 B2 | 3/2016 | Lakes | |
| 9,838,457 B2 | 12/2017 | Lakes | |
| 10,013,699 B1* | 7/2018 | Pope | G06Q 30/0211 |
| 10,275,780 B1 | 4/2019 | McCullough et al. | |
| 10,679,198 B2 | 6/2020 | Schueller et al. | |
| 10,699,293 B2 | 6/2020 | Chen | |
| 10,846,361 B2 | 11/2020 | Tsirkin | |
| 2001/0020231 A1 | 9/2001 | Perri | |
| 2002/0128814 A1* | 9/2002 | Brandon | G06F 40/247 704/1 |
| 2002/0184095 A1 | 12/2002 | Scullard et al. | |
| 2003/0023687 A1 | 1/2003 | Wolfe | |
| 2004/0039733 A1 | 2/2004 | Soulanille | |
| 2004/0044565 A1 | 3/2004 | Kumar et al. | |
| 2004/0215542 A1 | 10/2004 | Rossides | |
| 2004/0236835 A1 | 11/2004 | Blankenship | |
| 2005/0065806 A1 | 3/2005 | Harik | |
| 2005/0182707 A1 | 8/2005 | Yeager | |
| 2006/0129463 A1* | 6/2006 | Zicherman | G06Q 30/0627 705/26.63 |
| 2007/0043583 A1 | 2/2007 | Davulcu | |
| 2007/0073591 A1 | 3/2007 | Perry | |
| 2007/0088713 A1 | 4/2007 | Baxter et al. | |
| 2007/0168506 A1 | 7/2007 | Douglas | |
| 2007/0268163 A1 | 11/2007 | Aydar | |
| 2007/0282714 A1 | 12/2007 | Aydar | |
| 2007/0288312 A1 | 12/2007 | Wang | |
| 2007/0288431 A1 | 12/2007 | Reitter et al. | |
| 2008/0027967 A1 | 1/2008 | Garbow et al. | |
| 2008/0065476 A1 | 3/2008 | Klein et al. | |
| 2008/0133365 A1 | 6/2008 | Sprecher et al. | |
| 2008/0133540 A1 | 6/2008 | Hubbard | |
| 2008/0208682 A1 | 8/2008 | Chandley et al. | |
| 2008/0221987 A1 | 9/2008 | Sundaresan et al. | |
| 2008/0281688 A1 | 11/2008 | Kluth | |
| 2008/0281754 A1 | 11/2008 | Kelley | |
| 2009/0006392 A1 | 1/2009 | Chen | |
| 2009/0018917 A1 | 1/2009 | Chapman et al. | |
| 2009/0216861 A1 | 8/2009 | Shiely | |
| 2009/0254838 A1 | 10/2009 | Rao et al. | |
| 2009/0259547 A1 | 10/2009 | Clopp | |
| 2009/0281893 A1 | 11/2009 | Muhonen et al. | |
| 2010/0010887 A1 | 1/2010 | Karlin et al. | |
| 2010/0058160 A1* | 3/2010 | Navarro | G06Q 30/02 705/26.1 |
| 2010/0082360 A1 | 4/2010 | Chien et al. | |
| 2010/0274647 A1* | 10/2010 | Earle | G06Q 30/0236 705/14.27 |
| 2010/0332404 A1 | 12/2010 | Valin | |
| 2011/0082730 A1 | 4/2011 | Karlin et al. | |
| 2011/0106628 A1 | 5/2011 | Nam et al. | |
| 2011/0106746 A1 | 5/2011 | Ventilla | |
| 2011/0173222 A1 | 7/2011 | Sayal | |
| 2011/0225195 A1 | 9/2011 | Kubicki | |
| 2011/0238533 A1 | 9/2011 | Shadchnev | |
| 2012/0005024 A1 | 1/2012 | Gutierrez | |
| 2012/0046960 A1* | 2/2012 | Salta | G06Q 50/01 705/1.1 |
| 2012/0117049 A1* | 5/2012 | Zhou | G06F 16/951 707/706 |
| 2012/0150644 A1 | 6/2012 | Shiely | |
| 2012/0173692 A1 | 7/2012 | Lakes | |
| 2012/0245976 A1 | 9/2012 | Kumar et al. | |
| 2012/0253918 A1 | 10/2012 | Marois et al. | |
| 2012/0290432 A1 | 11/2012 | Tedjamulia et al. | |
| 2012/0303425 A1 | 11/2012 | Katzin | |
| 2012/0323666 A1 | 12/2012 | King | |
| 2012/0331067 A1* | 12/2012 | Richter | H04L 51/42 709/206 |
| 2013/0110585 A1 | 5/2013 | Nesbitt | |
| 2013/0151416 A1 | 6/2013 | Ng et al. | |
| 2013/0166412 A1* | 6/2013 | Greaves | G06Q 30/0619 705/26.62 |
| 2013/0204701 A1 | 8/2013 | Calafiore et al. | |
| 2013/0212496 A1* | 8/2013 | Antebi | G06F 16/972 715/760 |
| 2013/0268367 A1 | 10/2013 | Erdogan | |
| 2014/0006154 A1 | 1/2014 | Shipman et al. | |
| 2017/0043583 A1* | 2/2017 | Mochizuki | B41J 2/18 |

FOREIGN PATENT DOCUMENTS

| | | | |
|---|---|---|---|
| WO | WO 2008002335 A1 | 1/2008 | |
| WO | WO 2009006606 A1 | 1/2009 | |
| WO | WO 20090045405 A1 | 4/2009 | |
| WO | WO 2009126941 A1 | 10/2009 | |
| WO | WO 2010090783 A2 | 8/2010 | |
| WO | WO 2011121455 A2 | 10/2011 | |
| WO | WO 2013148356 A1 | 10/2013 | |
| WO | WO 2013150479 A2 | 10/2013 | |

OTHER PUBLICATIONS

The Reply in response to the Communication of Dec. 2, 2016 as filed with the European Patent Office on Jun. 8, 2017 for corresponding European patent application No. 15713059.2.

The Communication dated Feb. 9, 2017 issued by the European Patent Office for co-pending European patent application No. 13717619.4.

The Reply in response to the Communication dated Mar. 8, 2016 as filed with the European Patent Office on Sep. 16, 2016 for co-pending European patent application No. 13717619.4.

The International Preliminary Report on Patentability issued by USPTO on Mar. 17, 2016 for PCT Application No. PCT/US2015/019212.

International Search Report for corresponding application PCT/US2013/034151 dated Oct. 1, 2013.

Written Opinion of the International Searching Authority for corresponding application PCT/US2013/034151 dated Oct. 1, 2013.

* cited by examiner

SYSTEM AND METHOD FOR AFFILIATE LINK GENERATION

CROSS REFERENCE TO RELATED APPLICATIONS

This application is a continuation of and claims the benefit of priority to U.S. patent application Ser. No. 17/821,495, filed on Aug. 23, 2022, which is a continuation of U.S. patent application Ser. No. 17/232,977, filed on Apr. 16, 2021, now U.S. Pat. No. 11,455,665, issued on Sep. 27, 2022, which claims the benefit of priority to U.S. patent application Ser. No. 13/547,771, filed on Jul. 12, 2012, now U.S. Pat. No. 11,010,795, issued May 18, 2021, which claims the benefit of U.S. Provisional Patent Application No. 61/617,857, filed on Mar. 30, 2012, all of which are incorporated herein by reference in their entireties.

TECHNICAL FIELD

The present disclosure relates generally to electronic commerce, and in particular, to an affiliate link generation system.

BACKGROUND

With the rapid evolution of technology in recent years, there has been a growing trend toward on-line publishing, by businesses, such as on-line magazine publishers, as well as by individuals, such as personal bloggers. These on-line publishers frequently review and publish commentary on a variety of products on their web site. Accordingly, on-line marketing has evolved to include awarding commission to web site operators on sales made to consumers who have arrived at an affiliate's web site through a tracked link on the web site operator's web site.

Typically, web site operators are limited to earning commissions on products supported by a particular external affiliate network for which they can obtain an existing affiliate link. Moreover, these affiliate networks require the use of certain technology, which excludes users not employing the requisite technology.

SUMMARY

Embodiments of the present disclosure generally facilitate the creation of affiliate links directly from any page on a web site of a supported advertiser, including product and non-product pages (the "Webpage"), using a cross-advertiser and cross-browser compatibility and technology system, which allows web site operators to easily find and monetize their content.

According to one embodiment of the present disclosure, a computer system is configured for integrating affiliate networks to provide or dynamically create affiliate links on one platform to be used across all affiliate network platforms on all browsers.

In one embodiment, a user navigates to an individual Webpage and enables the system activator bookmark, which will display a record of the Webpage, including a product picture, product name, and price. The system will then dynamically generate an affiliate link. The affiliate link can be immediately used on the user's web site or other social media outlets, and tracked for analytics and cost per acquisition (CPA) conversion purposes.

If a record of the Webpage is not found, the system will scrape the Webpage to ascertain product information and create a new record of the Webpage using the product information. The system will then dynamically generate an affiliate link. If the system cannot ascertain product information from the scrape, the system will dynamically generate an affiliate link to the Webpage. The system will create a new record of the Webpage using general Webpage information, rather than information related to specific product information. The affiliate link can be immediately used on the user's web site or other social media outlets, and tracked for analytics and cost per acquisition (CPA) conversion purposes.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

The present disclosure generally provides a system and method of generating affiliate links. More particularly, the present disclosure provides a system and method of aggregating and integrating affiliate links from external affiliate network databases, as well as dynamically generating links for affiliate Webpages not located in existing external affiliate network databases.

Figure 1:
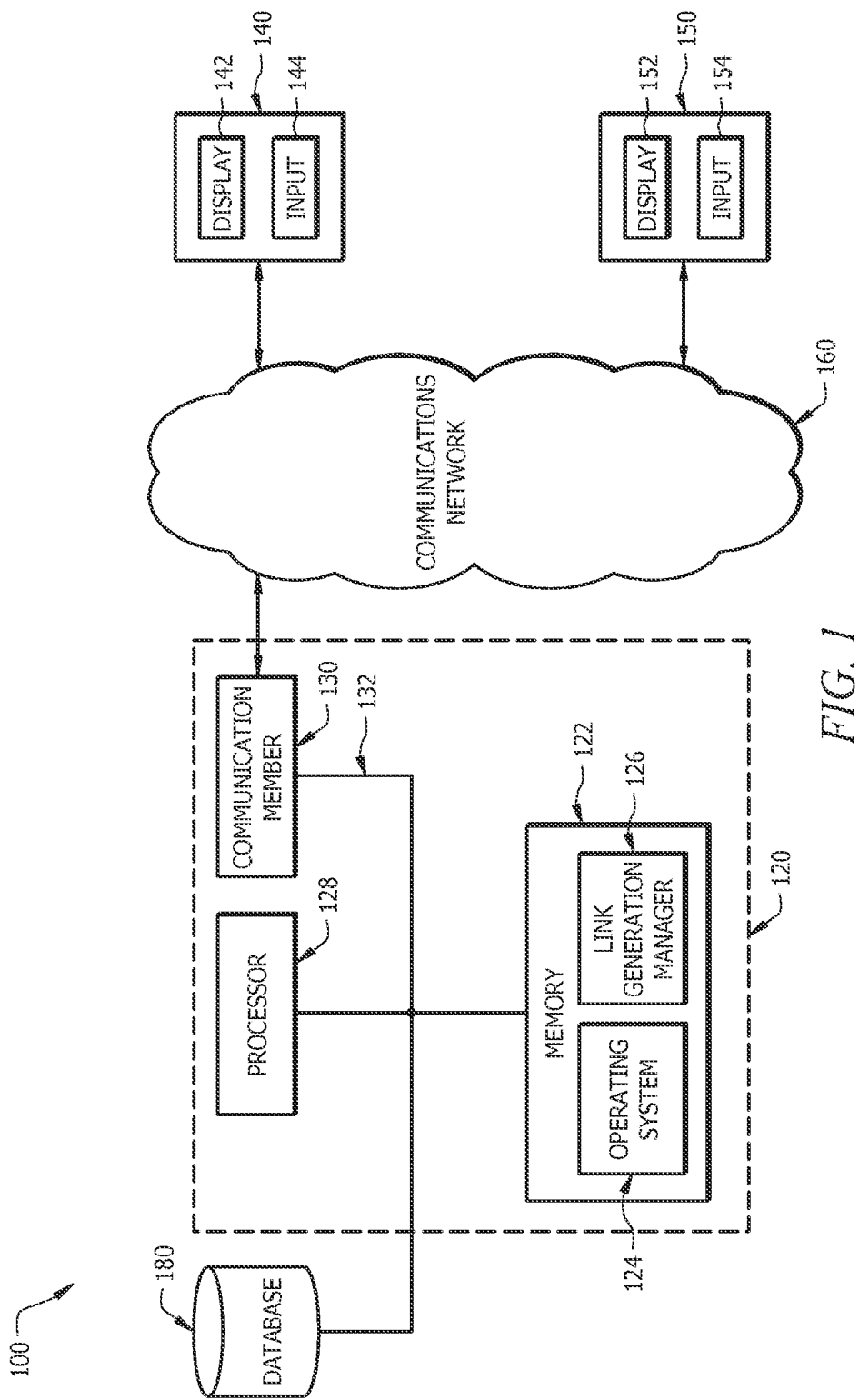
FIG. 1 is a block diagram of a computer environment for implementing an affiliate link generation system in accordance with one embodiment of the present disclosure.

FIG. 1 generally illustrates affiliate link generation system 100 according to one embodiment of the present disclosure. It should be understood that system 100 shown in FIG. 1 is for illustrative purposes only and that any other suitable system or subsystem could be used in conjunction with or in lieu of system 100 according to one embodiment of the present disclosure.

System 100 allows an on-line publisher 140 to communicate and interact with link generation server 120 through a communications network 160.

Link generation server 120 may generally include a computer system having a memory 122, at least one processor 128, and a communication member 130. Each element of the link generation server 120 is coupled to bus 132 or other communication mechanism for relaying information.

Memory 122 comprises both random access memory (RAM) and read-only memory (ROM). Memory 122 may be employed to store program information, instructions to be executed by processor 128, and temporary information during execution of instructions by processor 128.

Within memory 122 reside operating system 124 and link generation manager 126. Operating system 124 may be employed as a software platform upon which the affiliate link generation application programs may execute. Link generation manager 126 may generally include program instruction sequences for generating affiliate links for affiliate Webpages.

Processor 128 may be employed to execute the program instructions that are stored by memory 122. Processor 128 capable of identifying and monitoring each on-line publisher 140 as well as communicating with each on-line publisher 140 via communications member 130 and communications network 160.

Communication member 130 comprises conventional hardware and software that facilitates coupling link generation server 120 to communications network 160.

In an embodiment, link generation server 120 is coupled to a database 180. Link generation server 120 may store information associated with affiliate Webpages in the database 180. Affiliate Webpage information stored in database 180 may be derived from affiliate sources, external affiliate network sources, other suitable sources, or any combination thereof. Information stored in database 180 may include affiliate product web pages, affiliate non-product web pages, product commissions, affiliate links if available, product descriptions, product options, product prices, and product pictures, or any other suitable affiliate Webpage information. Link generation server 120 may also store information corresponding to each on-line publisher 140, such names, addresses, phone numbers, commission account information, or any other suitable on-line publisher information, in the database 180.

On-line publishers 140 obtain affiliate links generated by link generation server 120 by communicating with link generation server 120 through communications network 160. On-line publishers 140 may be located in any geographical location.

Each on-line publisher 140 may generally include at least one display 142, to view affiliate Webpages and associated information, and at least one input device 144, to communicate with link generation server 120.

Link generation server 120 may also communicate link generation information to interested parties 150. Link generation information may include the Webpage, product name, product web page and on-line publisher information. Interested parties 150 may include affiliates, representatives of affiliates, marketing consultants, external affiliate networks, other parties interested in link generation data, or any combination thereof.

Each interested party 150 may generally include at least one display 152, to view link generation data, and at least one input device 154, to communicate with link generation server 120.

Any of displays 142 and/or displays 152 may be a mobile phone screen, liquid crystal display (LCD), light emitting diode screen (LED), plasma screen, cathode ray tube (CRT) monitor, high definition television (HDTV) screen, conventional television screen, projection television screen, video conferencing display, other suitable display, or any combination thereof.

Any of input devices 144 and/or input devices 154 may be an alphanumeric keyboard, mouse, trackball, cursor direction keys, touch pad, Touch Tone telephone, wireless telephone, two-way pager, personal digital assistant, voice recognition device, other suitable data input device, or any combination thereof.

The present disclosure is related to the use of link generation server 120 to dynamically generate affiliate links, as described herein. According to one embodiment of the present disclosure, execution of instructions stored in memory 122 allows processor 128 to implement the functionality described above.

In one embodiment, the core technology used is HTML, CSS, JavaScript on the client facing components of the tool and PHP, Apache, MySQL on the server side. The client part also employs third party JavaScript libraries such as JQuery and easyXDM. The server part also relies on database 180 with records of products provided by affiliate networks. By way of example but not limitation, current third party affiliate networks include Commission Junction, Linkshare, PepperJam, Google Affiliate Network, and various others.

In alternative embodiments, hardware circuitry may be used in conjunction with or in lieu of software instructions to implement the present disclosure. However, the present disclosure is not limited to any specific combination of hardware circuitry and/or software.

Figure 2:
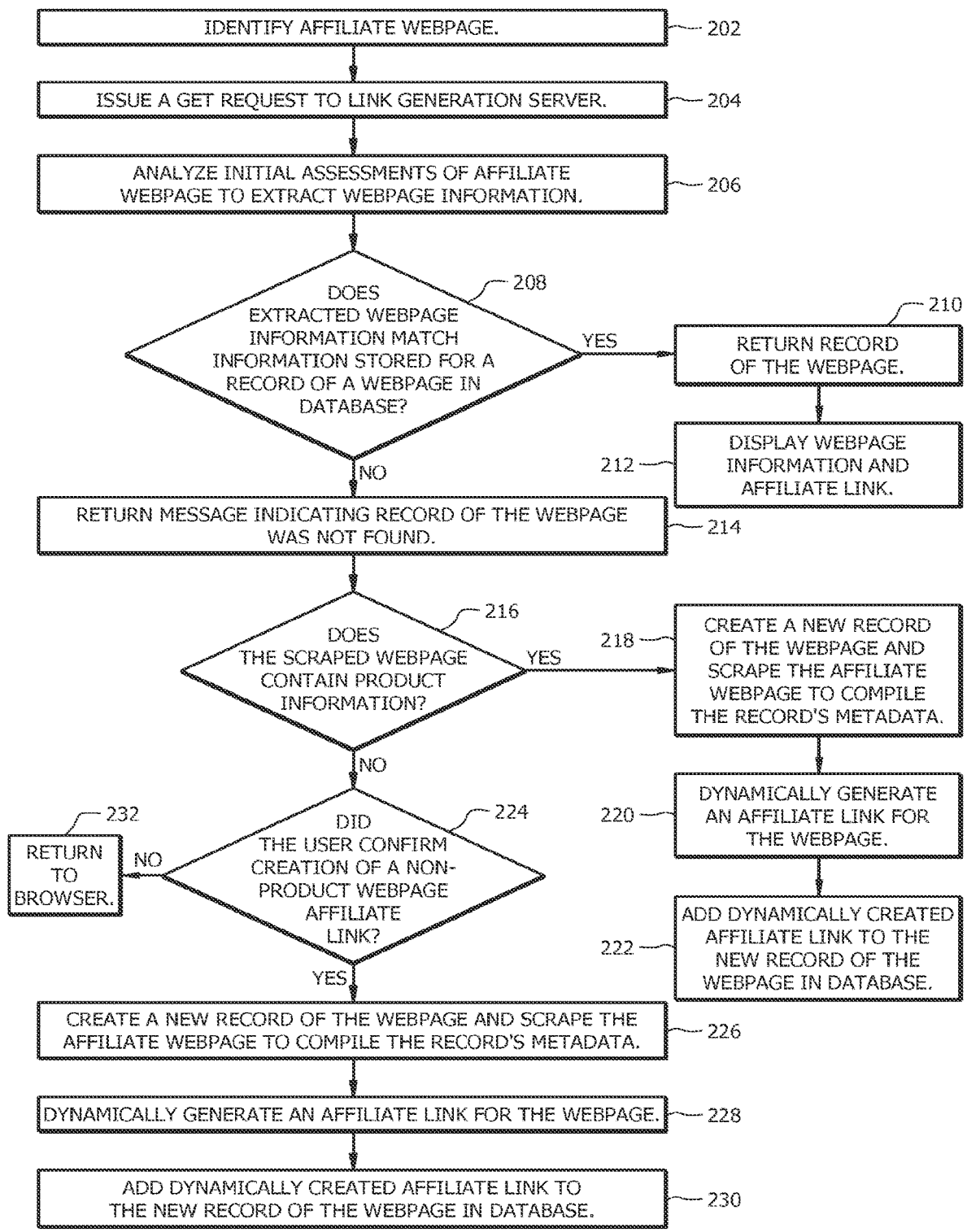
FIG. 2 is a somewhat simplified flow diagram illustrating a method of generating an affiliate link accordance with one embodiment of the present disclosure.

FIG. 2 a somewhat simplified flow diagram illustrating method 200 of generating affiliate links according to one embodiment of the present disclosure. It should be understood that method 200 shown in FIG. 2 is for illustrative purposes only and that any other suitable method or sub-method could be used in conjunction with or in lieu of method 200 according to one embodiment of the present disclosure. It should also be understood that the steps of method 200 could be performed in any suitable order or manner.

In an embodiment, method 200 begins in step 202 with a user identifying an affiliate Webpage to integrate into the user's web post using on-line publisher 140 by clicking a system activator bookmark from a bookmark bar in the on-line publisher 140 that executes an initialization JavaScript.

The on-line publisher 140 may then communicate the information to link generation server 120 by issuing a GET request through communications network 160 using Bluetooth, Wi-Fi, infrared, text message, email, bump technology or by any other suitable manner, as shown in step 204.

Link generation manager 126 analyzes initial assessments of the affiliate Webpage to extract Webpage information, as shown in step 206.

In step 208, link generation manager 126 determines the extracted Webpage information in step 206 matches Webpage information stored in database 180.

If link generation manager 126 determines the extracted Webpage information matches Webpage information stored in database 180, the link generation server 120 will return the record of the Webpage to on-line publisher 140, as shown in step 210. If the Webpage information stored in database 180 contains product information, link generation server 120 will either display the product picture through display 142 or prompt the user to input a product picture through input 144.

In one embodiment, the product picture is displayed as a result of parsing the parent HTML document and finding an image.

Link generation server 120 will then create a loader inline frame ("iframe") that will create a final iframe containing the Webpage information and the affiliate link. Link generation server 120 will communicate the Webpage information and affiliate link to on-line publisher 140, as shown in step 212.

Frames allow a visual HTML Browser window to be split into segments, each of which may show a different document. An frame places another HTML document in a frame inside the original parent document. Unlike an object element, an inline frame can be the "target" frame for links defined by other elements and it can be selected by the user agent as the focus for printing, viewing its source.

In one embodiment, communication between the JavaScript attached to the parent page and the iframe is implemented with the use of easyXDM. EasyXDM is a JavaScript library that enables a system to easily work around the limitation set in place by the Same Origin Policy, in turn making it easy to communicate and expose the JavaScript Application Programming Interface (API) across domain boundaries. EasyXDM provides a transport stack capable of passing string-based messages between the consumer and the provider. The transport stack offers bi-directionality, reliability, queuing and sender-verification and does not violate browser security policy since the connection is only established once and only simple plain text messages can be sent across the frames. The one-time connection setup is enforcer by easyXDM library to lock the connection down to avoid spoofing attacks.

If link generation manager 126 determines the extracted Webpage information does not match Webpage information stored in database 180, the link generation server 120 will return a message indicating the Webpage was not found through display 142, as shown in step 214.

In step 216, link generation server 120 will scrape the Webpage to determine if product information may be ascertained.

If link generation server 120 ascertains product information from the scraped Webpage, link generation server 120 will create a new record of the product and compile the record's metadata from the scraped Webpage, as shown in step 218.

In step 220, link generation server 120 will dynamically create an affiliate link for the Webpage.

In step 222, the new record of the Webpage and affiliate link dynamically created in step 220 will be added to database 180 for use by a plurality of on-line publishers 140.

If link generation server 120 ascertains that product information cannot be scraped from the Webpage, link generation server 120 will prompt the user to confirm creation of a non-product Webpage affiliate link, as shown in step 224.

If the user confirms creation of a non-product page affiliate link, link generation server 120 will create a new record of the Webpage and compile the record's metadata from the scraped non-product Webpage, as shown in step 226.

In step 228, link generation server 120 will dynamically create an affiliate link for the Webpage.

In step 230, the new record of the Webpage and affiliate link dynamically created in step 220 will be added to database 180 for use by a plurality of on-line publishers 140.

If the user does not confirm creation of a non-product page affiliate link, link generation server 120 will return the user to the browser screen, as shown in step 232.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A computer-implemented method for dynamically generating affiliate links, the method comprising:
    as a webpage associated with a product is displayed on a browser executing on a second processor associated with a user, receiving, by a link generation server that includes a first processor, a request from the second processor to generate a custom link to the webpage for integration into online content of a user, wherein the request identifies the webpage;
    extracting for assessment, by the link generation server, at least a portion of webpage information of the webpage identified by the request;
    determining, by the link generation server, at least the portion of webpage information extracted from the webpage has not been previously stored by the link generation server;
    in response to the determination, storing, by the link generation server, at least the portion of the webpage information extracted from the webpage, the extracted webpage information including product information associated with the product;
    dynamically generating, by the link generation server, the custom link to the webpage; and
    causing the second processor to display, on the browser displaying the webpage, a portion of the product information from the extracted webpage information and the generated custom link to the webpage for integration into the online content.

2. The computer-implemented method of claim 1, further comprising segmenting a window of the webpage.

3. The computer-implemented method of claim 2, further comprising:
    causing the webpage to be displayed in a first segment of a browser window of the browser and the portion of the product information from the extracted webpage information and the generated custom link to be displayed within a second segment of the browser window separate from the first segment.

4. The computer-implemented method of claim 1, further comprising providing an estimated commission associated with the product for display.

5. The computer-implemented method of claim 1, wherein the portion of the product information includes one or more images associated with the product.

6. The computer-implemented method of claim 1, further comprising receiving, from the second processor, a selection of one image among one or more images associated with the product that are provided by the webpage.

7. The computer-implemented method of claim 1, further comprising prompting the user associated with the second processor to input a product image of the product.

8. The computer-implemented method of claim 1, wherein determining at least the portion of webpage information extracted from the webpage has not been previously stored by the link generation server further comprises:
    determining at least the portion of the webpage information does not match stored information within a record associated with the webpage.

9. The computer-implemented method of claim 1, wherein the custom link is unique to the user associated with the second processor.

10. The computer-implemented method of claim 1, wherein receiving the request from the second processor comprises:

receiving the request in response to the second processor detecting a selection of an activator control element on the browser displaying the webpage.

11. The computer-implemented method of claim 10, wherein the webpage is displayed within a browser window of the browser and the activator control element is a bookmark displayed on a browser bar of the browser.

12. A system for dynamic management of affiliate links, the system comprising:
 at least one server having at least one first processor configured to:
  as a webpage associated with a product is displayed on a browser executing on a second processor associated with a user, receive a request from the second processor to generate a custom link to the webpage for integration into online content of a user, wherein the request identifies the webpage;
  extract for assessment at least a portion of webpage information of the webpage identified by the request;
  determine at least the portion of webpage information extracted from the webpage has not been previously stored by the at least one server;
  in response to the determination, storing at least the portion of the webpage information extracted from the webpage, the extracted webpage information including product information associated with the product;
  dynamically generate the custom link to the webpage; and
  cause the second processor to display, on the browser displaying the webpage, a portion of the product information from the extracted webpage information and the generated custom link to the webpage for integration into the online content.

13. The system of claim 12, wherein the at least one server is configured to segment a window of the webpage.

14. The system of claim 12, wherein the at least one server is configured to provide an estimated commission associated with the product for display on the browser displaying the webpage.

15. The system of claim 12, wherein the portion of the product information includes one or more images associated with the product.

16. The system of claim 12, wherein the at least one server is configured to receive, from the second processor, a selection of one image among one or more images associated with the product that are provided by the webpage.

17. The system of claim 12, wherein the at least one server is configured to prompt the user associated with the second processor to input a product image of the product.

18. The system of claim 12, wherein to determine at least the portion of webpage information extracted from the webpage has not been previously stored by the at least one server, the at least one server is configured to determine at least the portion of the webpage information does not match stored information within a record associated with the webpage.

19. The system of claim 12, wherein the custom link is unique to the user associated with the second processor.

20. A non-transitory computer-readable medium storing computer-executable instructions which, when executed by at least one first processor of a server, cause the at least one first processor to perform operations comprising:
 as a webpage associated with a product is displayed on a browser executing on a second processor associated with a user, receiving a request from the second processor to generate a custom link to the webpage for integration into online content of a user, wherein the request identifies the webpage;
 extracting for assessment at least a portion of webpage information of the webpage identified by the request;
 determining at least the portion of webpage information extracted from the webpage has not been previously stored by the server;
 in response to the determination, storing at least the portion of the webpage information extracted from the webpage, the extracted webpage information including product information associated with the product;
 dynamically generating the custom link to the webpage; and
 causing the second processor to display, on the browser displaying the webpage, a portion of the product information from the extracted webpage information and the generated custom link for integration into the online content.

* * * * *